United States Patent
Hiramatsu et al.

(10) Patent No.: US 6,522,869 B1
(45) Date of Patent: Feb. 18, 2003

(54) TRANSMISSION APPARATUS

(75) Inventors: Katsuhiko Hiramatsu, Yokosuka (JP); Mitsuru Uesugi, Yokosuka (JP); Masatoshi Watanabe, Yokohama (JP); Toyoki Ue, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/446,082

(22) PCT Filed: Apr. 27, 1999

(86) PCT No.: PCT/JP99/02260
§ 371 (c)(1),
(2), (4) Date: Dec. 17, 1999

(87) PCT Pub. No.: WO99/56425
PCT Pub. Date: Nov. 4, 1999

(30) Foreign Application Priority Data

Apr. 28, 1998 (JP) ............................................ 10-119562

(51) Int. Cl.⁷ ................................................. H04B 1/04
(52) U.S. Cl. ........................................ 455/127; 455/115
(58) Field of Search ........................... 333/166; 455/108, 455/110, 112, 115, 116, 127; 375/302; 332/100, 103

(56) References Cited

U.S. PATENT DOCUMENTS

| | | | | |
|---|---|---|---|---|
| 3,571,713 A | * | 3/1971 | Zachary | 455/143 |
| 3,619,781 A | * | 11/1971 | Cartianu et al. | 333/166 |
| 4,835,791 A | * | 5/1989 | Daoud | 375/301 |
| 5,170,495 A | * | 12/1992 | McNicol et al. | 455/116 |
| 5,172,071 A | * | 12/1992 | Braathen | 330/129 |
| 5,302,914 A | | 4/1994 | Arntz et al. | |
| 5,339,040 A | * | 8/1994 | Loper | 329/358 |
| 5,757,931 A | * | 5/1998 | Yamada et al. | 381/61 |
| 5,790,555 A | | 8/1998 | Narahashi et al. | |
| 5,854,571 A | * | 12/1998 | Pinckley et al. | 330/129 |
| 6,018,650 A | * | 1/2000 | Petsko et al. | 455/234.1 |
| 6,118,987 A | * | 9/2000 | Hiramatsu et al. | 455/108 |

FOREIGN PATENT DOCUMENTS

| | | |
|---|---|---|
| EP | 0735731 | 10/1996 |
| JP | 61-176221 | 8/1986 |
| JP | 5-130191 | 5/1993 |
| JP | 6-204959 | 7/1994 |
| JP | 7-321861 | 12/1995 |
| JP | 8-274734 | 10/1996 |
| JP | 8-274748 | 10/1996 |
| WO | 99/56425 | 11/1999 |

OTHER PUBLICATIONS

English Language Abstract of JP 7–321861.
An English Language abstract of JP 5–130191.
An English Language abstract of JP 61–176221.

* cited by examiner

Primary Examiner—Dwayne Bost
Assistant Examiner—L West
(74) Attorney, Agent, or Firm—Greenblum & Bernstein, P.L.C.

(57) ABSTRACT

Signals subjected to orthogonal modulation with a plurality of carrier frequencies are added to detect peak power. Based on the peak power, a coefficient for suppressing an amplitude of a transmission baseband signal is calculated. Using the coefficient, the amplitude of a baseband signal to be inputted to a filter is suppressed. It is thereby possible to suppress the peak power assuredly, and by the effects of the filter, unnecessary frequencies are not generated.

11 Claims, 9 Drawing Sheets

TRANSMISSION APPARATUS

TECHNICAL FIELD

The present invention relates to a transmission apparatus for transmitting a signal with a plurality of career frequencies.

BACKGROUND ART

A conventional communication apparatus, more particularly, a transmission apparatus is explained using Japanese Unexamined Patent Publication HEI8-274734. FIG.1 is a block diagram illustrating a configuration of the conventional transmission apparatus. In a radio communication apparatus with the above configuration, input modulated signals input from input terminals $11_1$ to $11_n$ are respectively subjected to frequency conversion to be with different frequency bands to each other in frequency conversion sections $12_1$, to $12_n$. The converted outputs are provided to power combining section 16 through respective variable attenuators $21_1$, to $21_n$, to be signal-multiplexed, and the multiplexed signal is output. A part of the multiplexed output is branched, and an envelope power level is detected at level detection section 23. When the detected level L exceeds level Ls which is k times (k is about 4 to 5) the average power level of the multiplexed signal, control section 24 controls attenuators $21_1$, to $21_n$ to attenuate the average power level of the modulated signal power to be less than k/n time the average power level for about 1/ΔFo (sec) (Fo is a frequency of a band width of the multiplexed signal).

However, there are two problems described below in the conventional technology.

First, in the conventional technology, since an attenuation amount is determined based on the power level combined in the power combining section, the problem occurs that a transmission signal is output from the power combining section while the level detection section, the control section and attenuation sections are executing the processing. Therefore, it is necessary to configure an amplifier, which is provided at a latter part in the configuration, in such a manner that distortions are not generated therein even when a large peak power level is inputted thereto. Generally, the amplifier configured in such the manner has a large scale and large heating value, and a high price.

In addition, the conventional technology is considered to employ FSK signals as transmission signals. The FSK modulated signals have a single frequency during a symbol time. The frequency for the symbol normally ranges from several kHz to several hundreds kHz, which is a very long time with respect to the time 1/ΔFo for the attenuation described in this specification. Accordingly, the conventional technology adequately functions even when a response rate to the attenuation is slow to some degree.

However, in a PSK modulation system and a QAM modulation system, amplitudes and phases vary even during the symbol time. The rate for such variations is almost equal to the rate for the variations for power addition results. Accordingly, in the case where the response rate to the attenuation is slow, the suppression for the peak power level is not performed in time, and the power level attenuates at the time the power addition result does not exceed an expected level.

DISCLOSURE OF INVENTION

An object of the present invention is to provide a transmission apparatus capable of attenuating a peak power level prior to the signal output, without needing an amplifier configured in such a manner that distortions are not generated therein even when a large peak power level is inputted thereto.

The object is achieved by a transmission apparatus for performing an orthogonal modulation with a plurality of carrier frequencies, adding modulated signals to detect a peak power level, based on the peak power level, calculating a coefficient for suppressing an amplitude of a transmission baseband signal, and using the coefficient suppressing the amplitude of the baseband signal to be inputted to a band pass filter. It is thus possible to suppress the peak power level assuredly, and unnecessary frequencies are generated by effects of the band pass filter.

BEST MODE FOR CARRYING OUT THE INVENTION

Embodiments of the present invention are explained specifically below with reference to accompanying drawings.

First Embodiment

Figure 1:
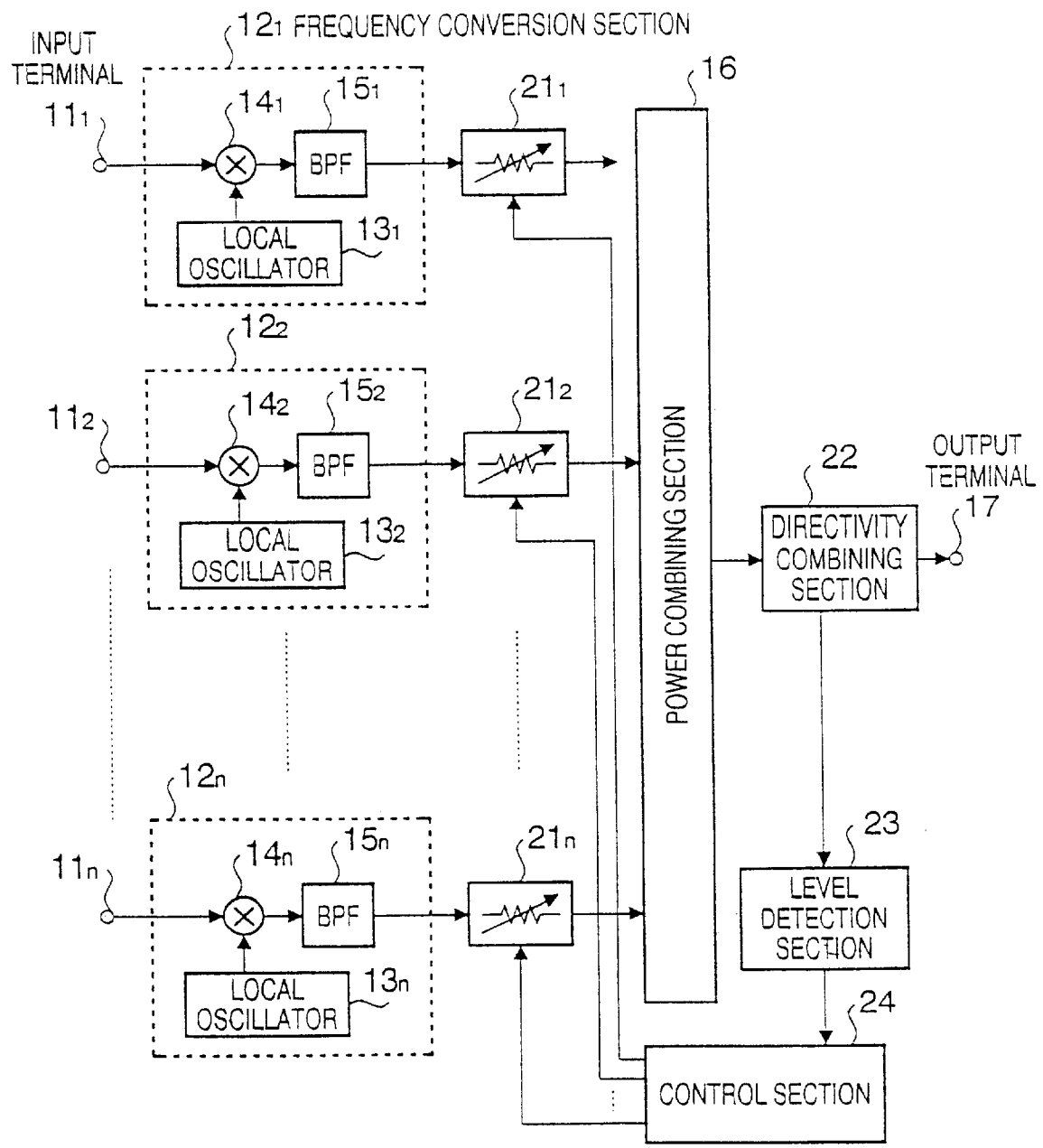
FIG. 1 is a block diagram illustrating a configuration of a conventional radio communication apparatus.
Figure 2:
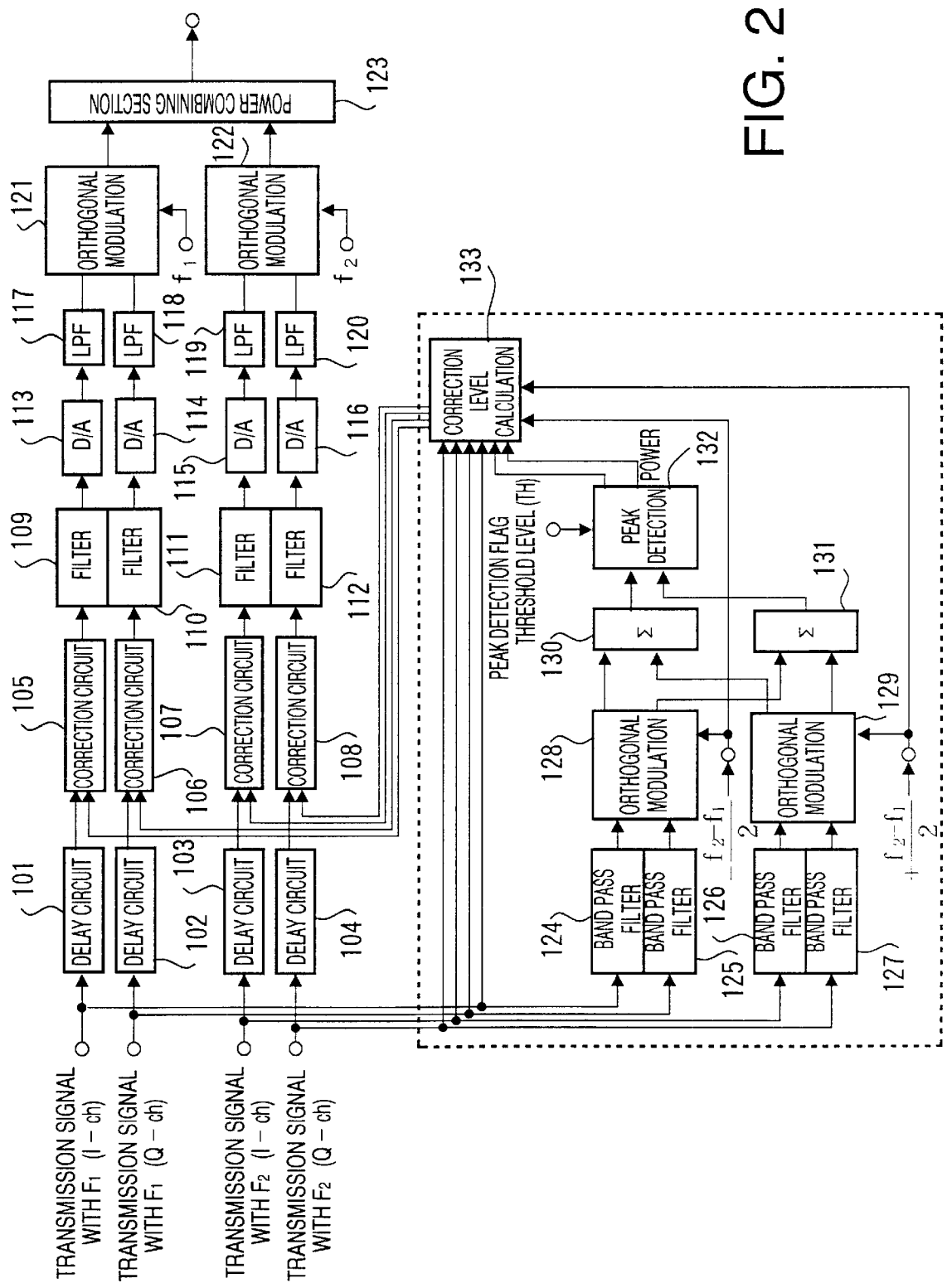
FIG. 2 is a block diagram illustrating a configuration of a radio communication apparatus according to a first embodiment of the present invention.

FIG. 2 is a block diagram illustrating a configuration of a transmission apparatus according to the first embodiment of the present invention. The transmission apparatus employs a peak power reduction method in a multicarrier frequency amplification system.

Delay circuits 101 and 102 delay modulated baseband signals to be transmitted with carrier frequency f1. Similarly, delay circuits 103 and 104 delay modulated baseband signals to be transmitted with carrier frequency f2. The delay time is set to correspond to a time required by th e processing for calculating a correction coefficient to suppress a peak power level of combined power. In addition, when the calculation time for the correction coefficient is adequately fast, it is not necessary to adjust the time in the delay circuits.

The amplitude of each delayed signal is corrected respectively in correction circuits 105 to 108. The correction processing is explained later. The signals with a corrected amplitude are subjected to band pass processing in filters 109 to 112 respectively. The signals subjected to the band pass processing in filters 109 to 112 are converted into analog signals in D/A converters 113 to 116 respectively. Next, components of refrain frequency of converted analog signals are eliminated in LPF 117 to 120 respectively.

Orthogonal modulator 121 converts the frequency of a baseband signal to be transmitted with carrier frequency f1 to carrier frequency f1. Similarly, orthogonal modulator 122 converts the frequency of a baseband signal to be transmitted with carrier frequency f2 into carrier frequency f2. Thereafter, power combining section 123 combines the signal with carrier frequency f1 and the signal with carrier frequency f2. For example, in the case where the combined result is used in a radio communication apparatus, the result is amplified in an amplifier, and transmitted from an antenna. In the case where the combined result is used in a cable communication apparatus, the result is amplified in an amplifier, and transmitted through a cable. The frequency of the combined result may be further converted into a higher frequency.

In the case where a difference between the average power level and the peak power level is large in the power of the power-combined result, an amplifier with a wide dynamic range for the average power level is necessary. Accordingly, it is necessary to suppress the peak power level.

The suppression of the peak power level is explained below.

First, the peak power level detection method is explained. Filters 124 to 127 subject transmission baseband signals to filtering. As the filters 124 to 127, the same filters as filters 109 to 112 are used in the case where the peak level detection is performed precisely. However, for the purpose of reducing a calculation amount in the case where the filter is achieved by software processing, or that of reducing a circuit scale in the case where the filter is achieved by hardware processing, it may possible to replace the filters 124 to 127 with filters with almost the same frequency characteristics and having a shorter tap length as compared to the filters 109 to 112. It is thus possible to reduce a calculation scale or circuit scale in a peak power calculation circuit.

Orthogonal modulators 128 and 129 subject the filter processed outputs to the orthogonal modulation. Although the orthogonal modulators are achieved by either of an analog circuit or a digital circuit, the digital circuit is used to achieve because it is preferable to execute correction coefficient detection processing with digital processing. FIG. 2 illustrates the case where the orthogonal modulators are achieved by the digital circuit. In the case where the analog circuit is used to achieve, a D/A converter and LPF are needed.

In the case where the orthogonal modulation is executed by digital signal processing, the modulated baseband signal is subjected to the orthogonal modulation with a center frequency of 0Hz. For example, in the case where transmission is performed using carrier frequency f1 and carrier frequency f2, the signal to be transmitted with carrier frequency f1 is subjected to the orthogonal modulation with a frequency of −(f2−f1)/2, and the signal to be transmitted with the carrier frequency f2 is subjected to the orthogonal modulation with a frequency of +(f2−f1)/2.

Figure 3:
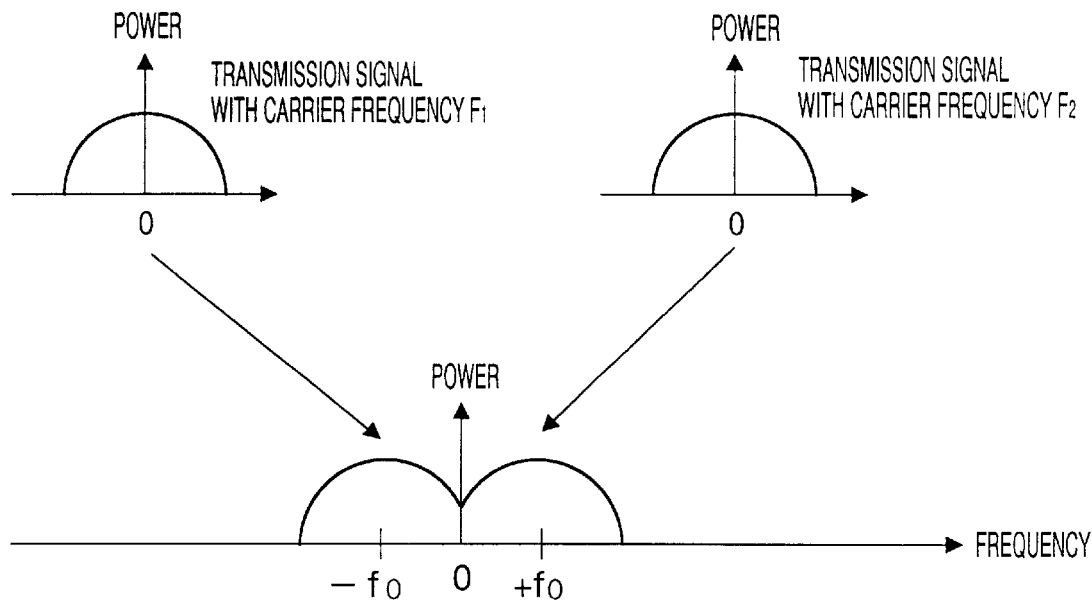
FIG. 3 is a diagram illustrating orthogonal modulated signals on a frequency axis in the radio communication apparatus according to the above embodiment.

Then, adder 130 adds an I-ch component of the signal obtained by subjecting the modulated baseband signal for carrier frequency f1 to the orthogonal modulation, and that of the signal obtained by subjecting the modulated baseband signal for carrier frequency f2 to the orthogonal modulation. Adder 131 adds a Q-ch component of the signal obtained by subjecting the modulated baseband signal for carrier frequency f1 to the orthogonal modulation, and that of the signal obtained by subjecting the modulated baseband signal for carrier frequency f2 to the orthogonal modulation. FIG. 3 illustrates operations for the orthogonal modulation processing on a frequency axis.

In addition, in this embodiment, since it is possible to execute the orthogonal modulation by the digital signal processing, the orthogonal modulation can be executed with low carrier frequencies. In the peak power detection, there is no difference between a signal with zeroIF (intermediate frequency of zero) and a signal with a low carrier frequency, it is preferable to process with the zeroIF. It is thereby possible to make the sampling frequency in the digital circuit the smallest one. In addition, it is possible to reduce the number of D/A converters for outputting the IF-frequency to 1, and further to reduce an analog orthogonal modulation circuit.

Figure 4:
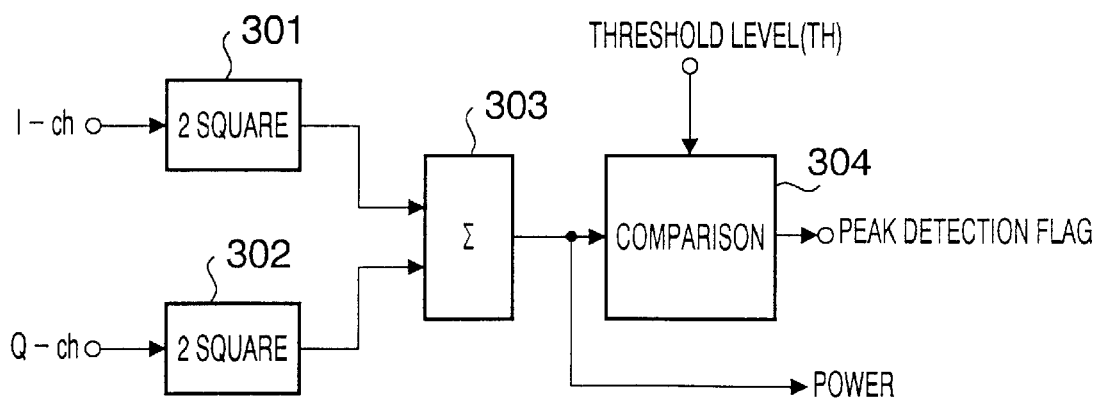
FIG. 4 is a block diagram of a peak power detection circuit in the radio communication apparatus according to the above embodiment.

Next, peak power detection circuit 132 detects a peak power level exceeding a threshold level with respect to results obtained by executing the orthogonal modulation. FIG. 4 illustrates an example of the peak power detection circuit. Square circuit 301 calculates the square of the I-ch component, and square circuit 302 calculates the square of the Q-ch component. Addition circuit 303 adds respective results. The added power level is a power level of the resultant signal obtained by adding orthogonal-modulated signals. Further, comparison circuit 304 compares the added power level to the threshold level, and provides the compared result to correction coefficient calculation circuit 133 with a peak power detection flag when the added power level is larger than the threshold level. Comparison circuit 304 concurrently calculates a target level δ to be corrected to provide also to correction coefficient calculation circuit 133. The target level δ is calculated by subtracting the threshold level from the detected power level as shown in the following equation 1:

$$\delta = z^2(t) - th \qquad \text{Equation 1}$$

where $z^2(t)$ is a power level of the resultant signal obtained by subjecting the signals with the multicarrier frequency to the orthogonal modulation.

Secondly, the correction coefficient calculation method is explained. The correction of the peak power level is executed by multiplying an amplitude of a signal to be inputted to the filter by α. Considered herein is the case where the filter is achieved with a FIR filter. When an input signal with the tap number n is multiplied by α, each of signals becomes $\alpha x_{1I}(t)$, $\alpha x_{1Q}(t)$, $\alpha x_{2I}(t)$ or $\alpha x_{2Q}(t)$, where x(t) denotes a modulated baseband signal, the first number of the subscript denotes the carrier frequency number, and the last number of the subscript denotes I-ch or Q-ch.

A FIR-filter output signal obtained by multiplying the signal with the tap number n by a is as shown in the following equation 2:

$$y'(t) = \sum_{i=0}^{N-1} [h(i)x(t - iT_s) + (\alpha - 1)h(n)x(t - nT_s)] \qquad \text{Equation 2}$$

-continued $$= y(t) + (\alpha - 1)h(n)x(t - nT_s)$$

where the equation is represented without subscript numbers, and h( ) denotes the tap coefficient, Ts denotes a sampling rate, and y( ) denotes the filter output. When α=1, the filter output is the same as the result obtained with no correction.

When the signals represented with the equation 2 are each subjected to the orthogonal modulation, and then added, the result is as shown in the following equations 3 to 5:

$$z'^2(t) = z'^2_I(t) + z'^2_Q(t) \quad \text{Equation 3}$$

$$z'_I(t) = \sum_{k=0}^{K-1} [y'_{kI}(t)\cos\omega_k t - y'_{kQ}(t)\sin\omega_k t] \quad \text{Equation 4}$$

$$= z_I(t) + (\alpha - 1)h(n)$$

$$\sum_{k=0}^{K-1} [x_{kI}(t - nT_s)\cos\omega_k t - x_{kQ}(t - nT_s)\sin\omega_k t]$$

$$= z_I(t) + (\alpha - 1)h(n)X_I(n, t)$$

$$z'_Q(t) = \sum_{k=0}^{K-1} [y_{kI}(t)\sin\omega_k t + y_{kQ}(t)\cos\omega_k t] \quad \text{Equation 5}$$

$$= z_Q(t) + (\alpha - 1)h(n)$$

$$\sum_{k=0}^{K-1} [x_{kI}(t - nT_s)\sin\omega_k t + x_{kQ}(t - nT_s)\cos\omega_k t]$$

$$= z_Q(t) + (\alpha - 1)h(n)X_Q(n, t)$$

where K is the number of carrier frequencies, and $\omega_k$ is an angular velocity with the carrier frequency number k.

The equation 3 has a value obtained by subtracting the correction target level δ from power level $z^2(t)$ before being corrected, and is modified as shown in the following equation 6:

$$z'^2(t) = z^2(t) + h^2(n)(\alpha-1)^2\{X_I^2(n,t) + X_Q^2(n,t)\} + 2h(n)(\alpha-1)\{z_1(t)X_1(n,t) + z_Q(t)X_Q(n,t)\} = th \quad \text{Equation 6}$$

With the above equation 6, the equation for calculating the correction coefficient α is introduced. The calculated result is shown in the following equation 7:

$$\alpha = 1 + \frac{\beta(n,t)\{-1 \pm \sqrt{1 - X^2(n,t)\{z^2(t) - th\}/\beta^2(n,t)}\}}{h(n)X^2(n,t)} \quad \text{Equation 7}$$

where β (n,t) is as shown in the following equation 8:

$$\beta(n,t) = z_1(t)X_1(n,t) + z_Q(t)X_Q(n,t) \quad \text{Equation 8}$$

The content of the square root is approximated by series expansion, and substituted into the equation 8, and then the following equation 9 is obtained:

$$\alpha \approx 1 - \frac{z^2(t) - th}{2h(n)\{z_1(t)X_1(n,t) + z_Q(t)X_Q(n,t)\}} \quad \text{Equation 9}$$

Figure 5:
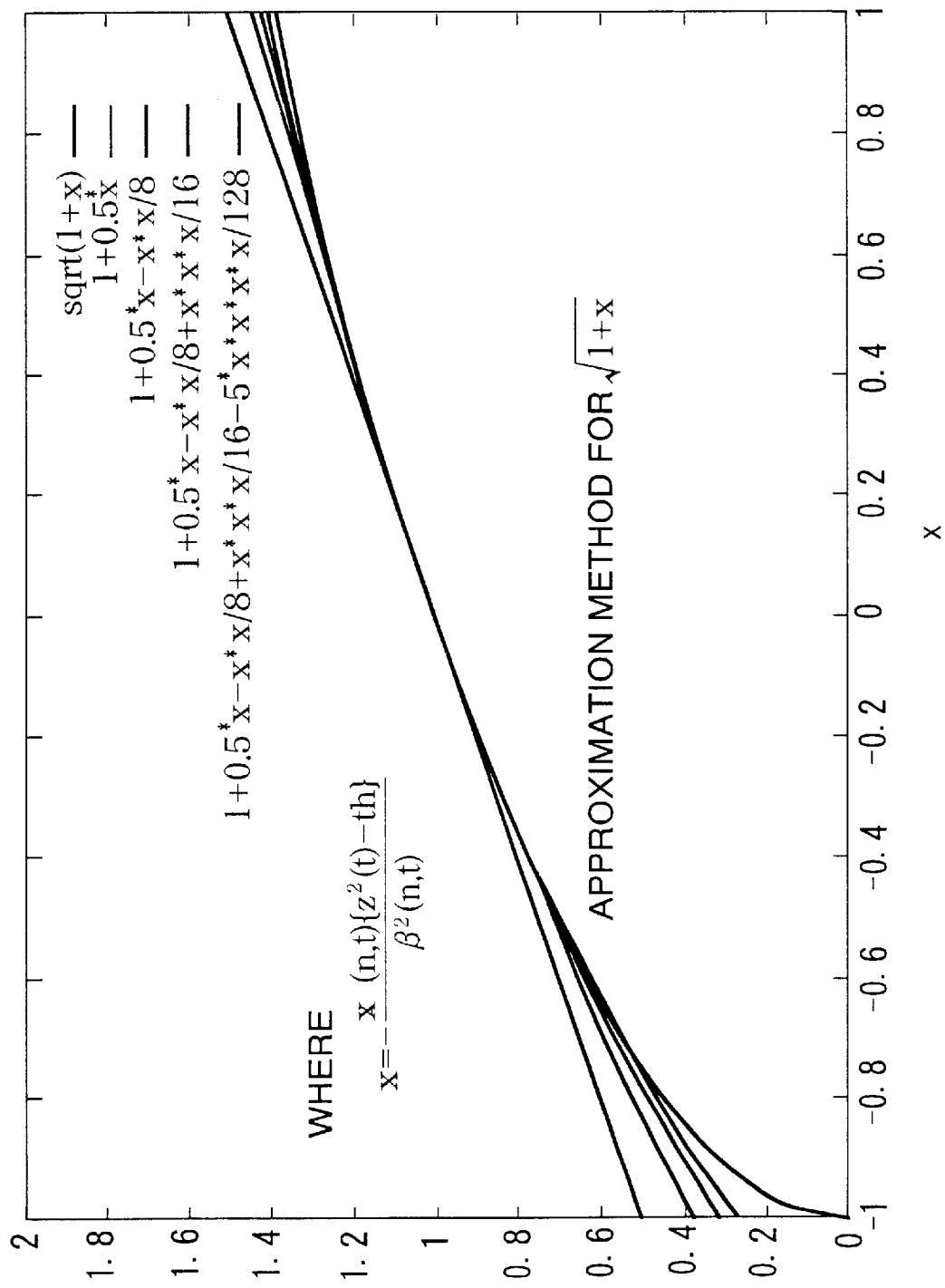
FIG. 5 is an explanatory diagram for an approximate expression in the radio communication apparatus according to the above embodiment.

Such an approximation is effective in a range of the following equation 10, as illustrated in FIG. 5:

$$-0.5 < -X^2(n,t)\{z^2(t) - th\}/\beta^2(n,t) \quad \text{Equation 10}$$

It is thus clarified that the correction coefficient a can be calculated from the tap coefficient h(n) with the tap number n, I-ch and Q-ch components of the resultant signal obtained by combining multicarrier-frequency signals ($z_I(n,t)$ and $z_Q(n,t)$ in the equation) and I-ch and Q-ch components of the signal obtained by adding the modulated baseband signals, with the tap number n, subjected to the orthogonal modulation ($X_I(n,t)$ and $X_Q(n,t)$ in the equation). The signal with the tap number n is corrected by being multiplied by α, using the correction coefficient a calculated with the equation 7 or 9.

Considered as selection methods for the above-mentioned tap number are as follows:

When the correction coefficient is a value close to zero, since the transmission signal at that time is made almost zero, it is preferable that the coefficient comes close to 1 as possible. It is noticed that as tap coefficient h(n) in the denominator in the equation 9 becomes larger, the correction coefficient comes close to 1. Accordingly, the first selection method for the tap number is a method for selecting a center tap number which has the largest tap coefficient. It is further noticed that as the denominator in the equation 9 becomes larger, the correction coefficient comes close to 1. Accordingly, the second method for the tap number is a method for calculating the denominator and selecting a tap coefficient for the largest denominator.

Thirdly, the following description explains about the correction. In the correction, an input signal at time t is multiplied by α using correction coefficient α calculated in correction coefficient calculation circuit 133.

According to the above-mentioned processing, it is possible to make the power subjected to multicarrier combining smaller than the threshold level. Since it is thus possible to correct the peak power level prior to the power combining when the peak power level exceeds the predetermined level, it is possible to attenuate the peak power prior to the signal output, thereby enabling no use of the amplifier configured in such a manner that distortions are not generated therein when a large peak power level is inputted thereto.

By thus correcting the transmission signal with the largest tap coefficient of the filter, the amplitude of a signal which is not inputted to the filter yet is corrected, thereby preventing unnecessary frequency components from being generated by the amplitude correction. Further, it is possible to configure the circuits concerning the relationship between the orthogonal modulation and power addition for the transmission, and the orthogonal modulation and power addition for the power calculation with no deterioration factors by an analog circuit. Furthermore, it is possible to make the sampling frequency the smallest.

In addition, in the transmission apparatus in this embodiment, by correcting the amplitude of the signal to be inputted to the filter, it is guaranteed that the correction of the amplitude does not provide adverse effects on frequencies. For example, the apparatus does not provide adverse effects on neighboring channel leak power and spurious power radiation which are essential as performance of a radio apparatus.

Second Embodiment

Figure 6:
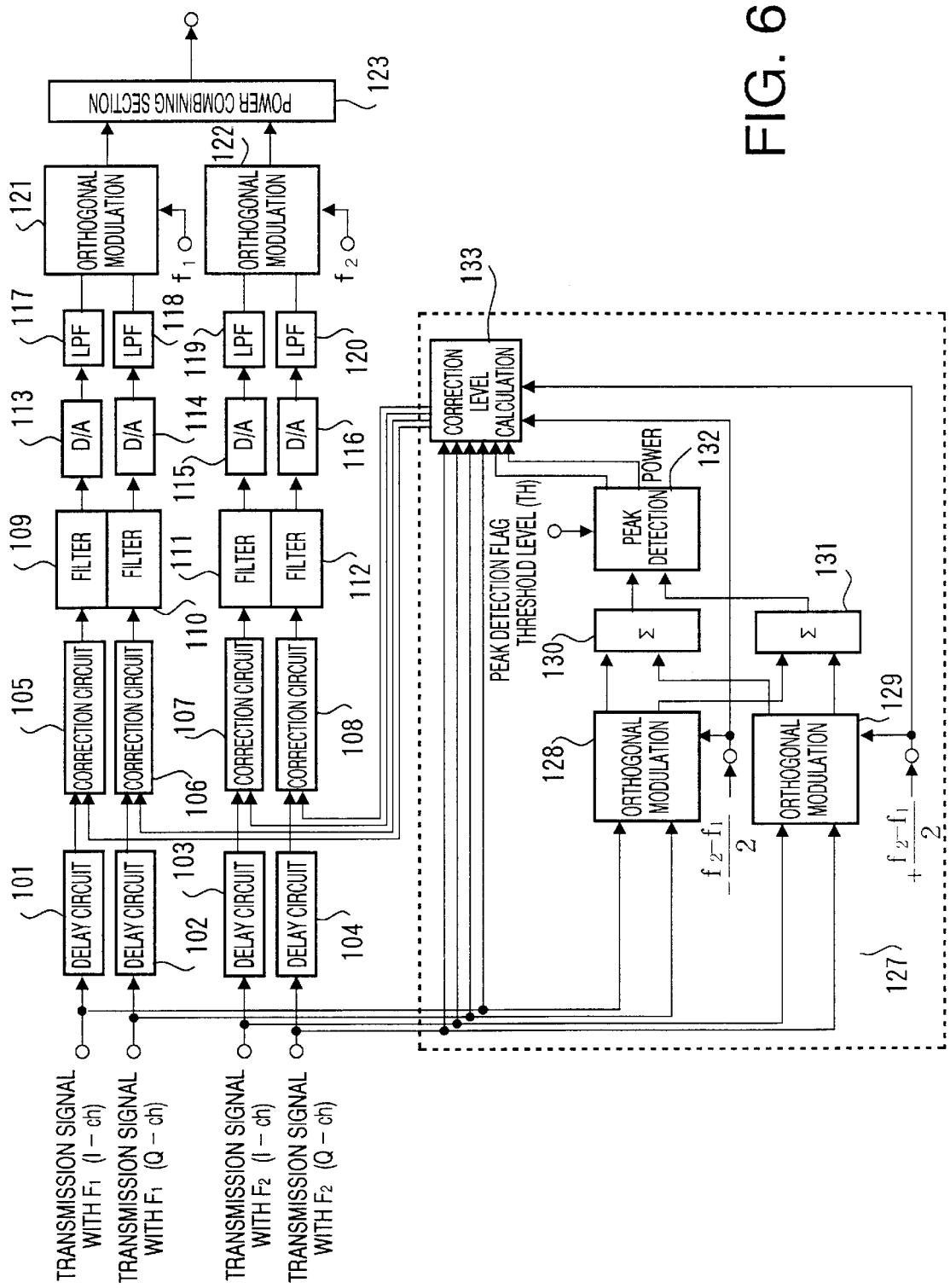
FIG. 6 is a block diagram illustrating a configuration of a radio communication apparatus according to a second embodiment.

FIG. 6 is a block diagram illustrating a configuration of a transmission apparatus according to the second embodiment. In the transmission apparatus illustrated in FIG. 6, filters in a peak level correction part in the transmission apparatus illustrated in FIG. 2 are eliminated. When the filters are used, an adder is generally needed, and as a result, the circuit scale becomes large. Therefore, in the second embodiment, the peak power level is calculated with the band pass processing not executed. In addition, in FIG. 6, the same sections as in FIG. 2 are given the same symbols as in FIG. 2 to omit explanations thereof.

In the case where the peak power level is detected with the band pass processing not executed, following problems are considered. In the PSK and QAM modulation systems, the peak power is generated between symbol points. Therefore, the peak power level calculated at the symbol point is generally higher than the actual peak power level. Accordingly, it is necessary to provide a margin to the threshold level δ explained in the first embodiment so as to enable the correspondence to the peak power generated between symbol points. It is necessary to vary the margin for fixed envelop modulation systems such as FSK and non-fixed envelop modulation systems such as PSK and QAM.

Operations in the transmission apparatus with the configuration as described above is explained using FIG. 6. The operations performed by a signal for carrier frequency f1 and a signal for carrier frequency f2 are combined are the same as in the first embodiment, and explanations thereof are omitted.

First, the peak power level detection method is explained. Orthogonal modulators 128 and 129 subject the modulated baseband signal to the orthogonal modulation. Although the orthogonal modulators are achieved by either of an analog circuit or a digital circuit, the digital circuit is used to achieve because it is preferable to execute correction coefficient detection processing with digital processing. FIG. 6 illustrates the case where the orthogonal modulators are achieved by the digital circuit. In the case where the analog circuit is used to achieve, a D/A converter and LPF are needed.

In the case where the orthogonal modulation is executed by digital signal processing, the modulated baseband signal is subjected to the orthogonal modulation with a center frequency of 0Hz. For example, in the case where transmission is performed using carrier frequency f1 and carrier frequency f2, the signal to be transmitted with carrier frequency f1 is subjected to the orthogonal modulation with a frequency of −(f2−f1)/2, and the signal to be transmitted with carrier frequency f2 is subjected to the orthogonal modulation with a frequency of +(f2−f1)/2. Then, adder 130 adds an I-ch component of the signal obtained by subjecting the modulated baseband signal for carrier frequency f1 to the orthogonal modulation, and that of the signal obtained by subjecting the modulated baseband signal for the carrier frequency f2 to the orthogonal modulation. Adder 131 adds a Q-ch component of the signal obtained by subjecting the modulated baseband signal for carrier frequency f1 to the orthogonal modulation, and that of the signal obtained by subjecting the modulated baseband signal for carrier frequency f2 to the orthogonal modulation. FIG. 3 illustrates operations for the orthogonal modulation processing on the frequency axis.

In addition, it is possible to execute the orthogonal modulation with a low carrier frequency. However, since there is no difference in the peak power detection between a signal with zero1F and a signal with the low carrier frequency, it is preferable to process with the zero1F.

Next, peak power detection circuit 132 detects the peak power level exceeding a threshold level with respect to results obtained by executing the orthogonal modulation. The peak power detection circuit is the same as used in the first embodiment.

Further, comparison circuit 304 compares the added power level to the threshold level, and provides the compared result to correction coefficient calculation circuit 133 with a peak power detection flag when the added power level is larger than the threshold level. Comparison circuit 304 concurrently calculates a target level δ to be corrected to provide also to correction coefficient calculation circuit 133. The target level δ is calculated by subtracting the threshold level from the detected power level. In the following equations, $z^2(t)$ is a power level of the resultant signal obtained by subjecting the signals with the multicarrier frequency to the orthogonal modulation. In addition, since the peak power level is not measured for an output signal from filters which is actually transmitted, a hat is used to evince an estimated level.

$$\delta = \hat{z}^2(t) - (th) \quad \text{Equation 11}$$

$$\hat{z}^2(t) = \hat{z}_I^2(t) + \hat{z}_Q^2(t) \quad \text{Equation 12}$$

$$\hat{z}_I(t) = \sum_{k=0}^{K-1} [x_{kI}(t - nT_s)\cos\omega_k t - x_{kQ}(t - nT_s)\sin\omega_k t] \quad \text{Equation 13}$$
$$= X_I(n, t)$$

$$\hat{z}_Q(t) = \sum_{k=0}^{K-1} [x_{kI}(t - nT_s)\sin\omega_k t + x_{kQ}(t - nT_s)\cos\omega_k t] \quad \text{Equation 14}$$
$$= X_Q(n, t)$$

Figure 7:
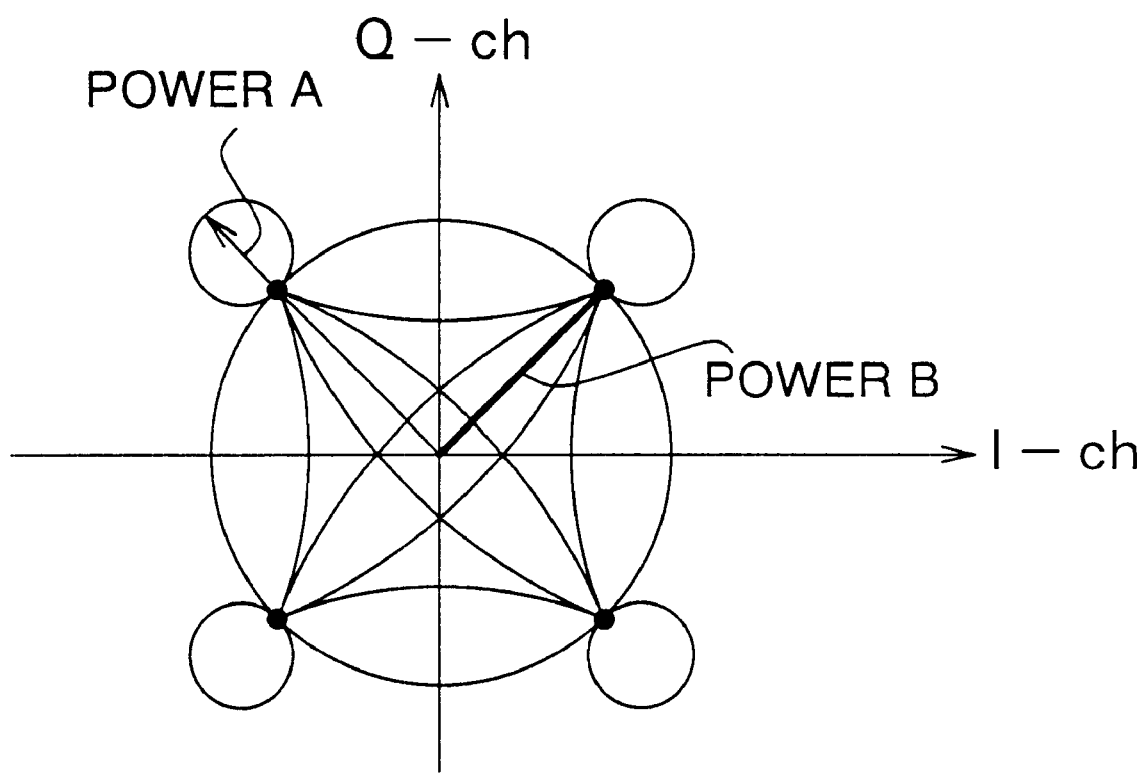
FIG. 7 is an explanatory diagram for power of a modulated signal in the radio communication apparatus according to the above embodiment.

As described above, in the case of the peak power measurement method with the interpolation processing and filter processing eliminated, as illustrated in FIG. 7, it is not possible to measure power level A generated by the state transition between symbol points, and only possible to measure power level B at the symbol point. The ratio of the power level $A(P_A)$ to the power level $B(P_B)$ varies depending on modulation systems and characteristics of the filter. Further, the ratio of the power level A to the power level B is different in the case where transmission is performed by multiplexing spreading codes such as a CDMA communication system. Accordingly, the ratio of the power level A to the power level B is measured beforehand by, for example, the simulation so as to correct the threshold level (th). The correction method is as shown in the following equation 15:

$$th' = \frac{P_A}{P_B} th \quad \text{Equation 15}$$

Secondly, the correction coefficient calculation method is explained. The correction method is calculated in the same way as in the first embodiment. The following equation 16 is obtained by substituting equations 13 and 14 for $z_I(t)$ and $z_Q(t)$ in the equation 6.

$$z'^2(t) = \hat{z}^2(t) + h^2(n)(\alpha-$$

$$1)^2\{X_I^2(n,t) + X_Q^2(n,t)\}$$

$$+ 2h(n)(\alpha-1)\{\hat{z}_I(t)X_I($$

$$n,t) + \hat{z}_Q(t)X_Q($$

$$n,t)\} = X^2(t) + h^2(n)(\alpha-1)^2 X^2($$

$$n,t) + 2h(n)(\alpha-1)X^2(n,t) = th \quad \text{Equation 16}$$

Further, the correction coefficient α is calculated as shown in the following equation 17:

$$\alpha = 1 - \frac{1 \pm \sqrt{th/X^2(n,t)}}{h(n)} \quad \text{Equation 17}$$

It is thus clarified that the correction coefficient α is calculated using the tap coefficient h(n) with the tap number n and the power level of a signal obtained by adding the modulated baseband signals, with the tap number n, subjected to the orthogonal modulation ($X^2(n,t)$ in the equation). Using the correction coefficient α calculated in the equation 17, the signal with tap number n is multiplied by α to correct. The selection method for the above-mentioned tap number is the same as in the first embodiment.

According to the above-mentioned processing, it is possible to make the power level subjected to multicarrier combining smaller than the threshold level. It is thus possible to attenuate the peak power prior to the signal output, thereby enabling no use of the amplifier configured in such a manner that distortions are not generated therein when a large peak power level is inputted thereto. Further, in addition to the effects by the first embodiment, it is possible to reduce the circuit scale because filters are not used at the side of correction value calculation.

In addition, in the transmission apparatus in this embodiment, by correcting the amplitude of the signal to be inputted to the filter, it is guaranteed that the correction of the amplitude does not provide adverse effects on frequencies. For example, the apparatus does not provide adverse effects on neighboring channel leak power and spurious power radiation which are essential as performance of a radio apparatus.

Third Embodiment

Figure 8:
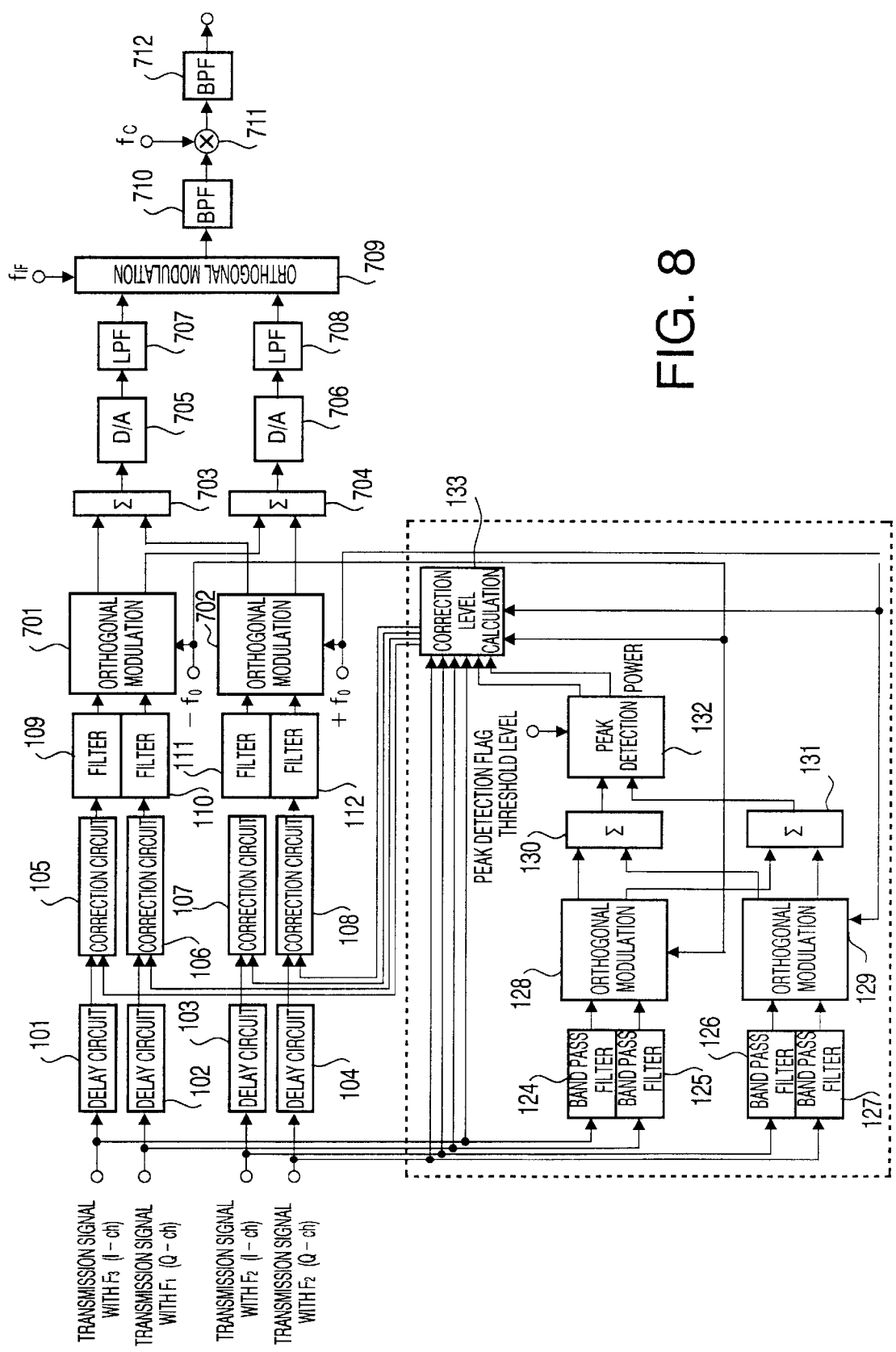
FIG. 8 is a block diagram illustrating a configuration of a radio communication apparatus according to a third embodiment.

FIG. 8 is a block diagram illustrating a configuration of a transmission apparatus according to the third embodiment of the present invention. In the transmission apparatus illustrated in FIG. 8, the orthogonal modulation is executed for digital signals. In addition, in FIG. 8, the same sections as in FIG. 2 are given the same symbols as in FIG. 2 to omit explanations thereof.

Delay circuits 101 and 102 delay modulated baseband signals to be transmitted with carrier frequency f1. Similarly, delay circuits 103 and 104 delay baseband modulated signals to be transmitted with carrier frequency f2. The delay time is set to correspond to a time required by the processing for calculating a correction coefficient to suppress a peak power level of combined power. In addition, when the calculation time for the correction coefficient is adequately fast, it is not necessary to adjust the time in the delay circuits.

The amplitude of each delayed signal is corrected respectively in correction circuits 105 to 108. The correction processing is explained later. The signals with a corrected amplitude are subjected to band pass processing in filters 109 to 112 respectively. The signals subjected to the band pass processing in filters 109 to 110 are subjected to the orthogonal modulation with a frequency of carrier frequency−(f2−f1)/2) in the orthogonal modulation circuit 701. Further, the signals subjected to the band pass processing in filters 111 to 112 are subjected to the orthogonal modulation with a frequency of carrier frequency+(f2−f1)/2 in orthogonal modulation circuit 702. In addition, it is assumed that f2>f1.

Then, adder 703 adds I-ch components of resultant signals respectively subjected to the orthogonal modulation, and adder 704 adds Q-ch components of resultant signals respectively subjected to the orthogonal modulation, which is the processing for generally generating zero1F signals. In the case where the zero1F is used to achieve, since the frequency band for the digital signals becomes the smallest, it is possible to make the sampling frequency smallest. The representation on the frequency axis is as shown in FIG. 3.

Next, D/A converters 705 and 706 convert the digital signals into analog signals. The components of refrain frequency of converted analog signals are eliminated in LPFs 707 and 708.

Further, analog orthogonal modulation circuit 709 subjects these signals to the orthogonal modulation, BPF 710 eliminates unnecessary frequency components from the orthogonal modulated signal, mixer 711 upconverts the resultant signal to the carrier frequency, and BPF 712 further eliminates unnecessary frequency components.

In the case of a radio communication apparatus, the resultant signal subjected to conversion into the multicarrier frequency is amplified in an amplifier and then transmitted from an antenna. Further, in the case of a cable communication apparatus, the resultant signal subjected to conversion into the multicarrier frequency is amplified In an amplifier and then transmitted through a cable.

In addition, the peak power detection method is the same as in the first and second embodiments. In the peak power detection method in the second embodiment, filters 124 to 127 are not needed. Further, the calculation method for correction coefficient α and the correction method are also the same as in the first and second embodiments.

According to the above-mentioned processing, it is possible to make the power subjected to multicarrier combining smaller than the threshold level. It is thus possible to attenuate the peak power prior to the signal output, thereby enabling no use of the amplifier configured in such a manner that distortions are not generated therein when a large peak power level is inputted thereto. Further, the same power combining method with the orthogonal modulation is used for the transmission and the peak power detection. In other words, the processing is executed for the digital signals, and therefore it is possible to detect the peak power correctly, and based on the detected power, suppress the peak power.

In addition, in the radio communication apparatus in this embodiment, by correcting the amplitude of the signal to be inputted to the filter, it is guaranteed that the correction of the amplitude does not provide adverse effects on frequencies. For example, the apparatus does not provide adverse effects on neighboring channel leak power and spurious power radiation which are essential as performance of a radio apparatus.

Fourth Embodiment

Figure 9:
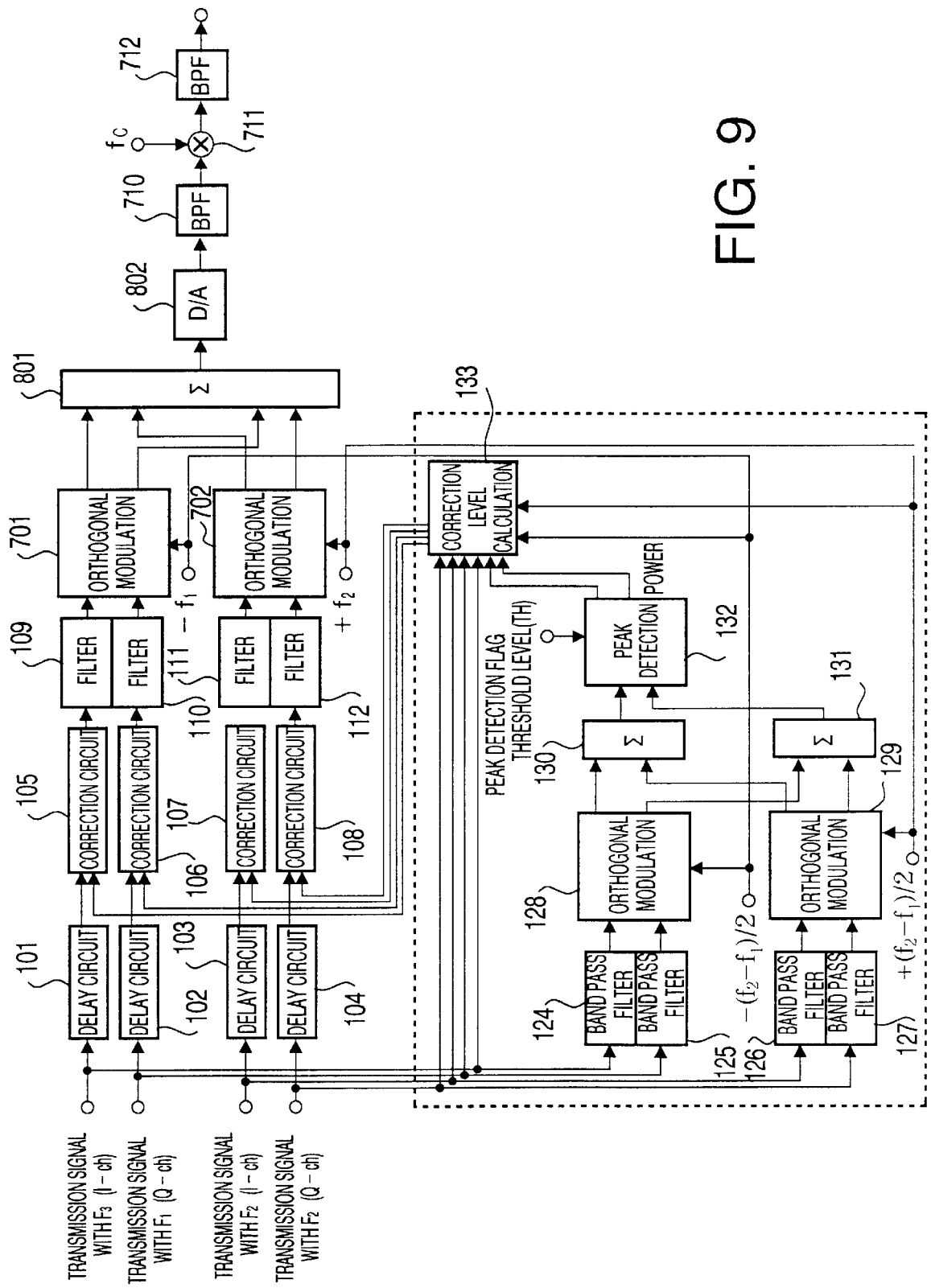
FIG. 9 is a block diagram illustrating a configuration of a radio communication apparatus according to a fourth embodiment.

FIG. 9 is a block diagram illustrating a configuration of a transmission apparatus according to the fourth embodiment of the present invention. In the transmission apparatus illustrated in FIG. 9, the zero1F processing is not executed. In addition, in FIG. 9, the same sections as in FIG. 8 are given the same symbols as in FIG. 8 to omit explanations thereof.

Delay circuits 101 and 102 delay modulated baseband signals to be transmitted with carrier frequency f1. Similarly, delay circuits 103 and 104 delay modulated baseband signals to be transmitted with carrier frequency f2. The delay time is set to correspond to a time required by the processing for calculating a correction coefficient to suppress a peak power level of envelop power. In addition, when the calculation time for the correction coefficient is adequately fast, it is not necessary to adjust the time in the delay circuits.

Figure 10:
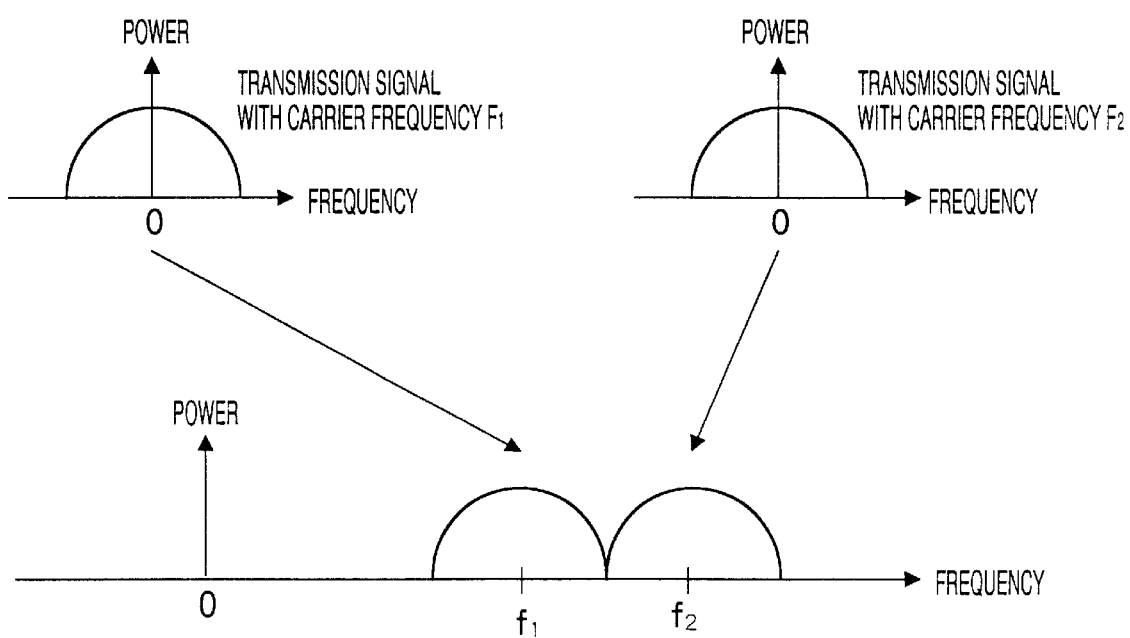
FIG. 10 is a diagram illustrating orthogonal modulated signals on a frequency axis in the radio communication apparatus according to the above embodiment.

The amplitude of each delayed signal is corrected respectively in correction circuits 105 to 108. The correction processing is explained later. The corrected signals are subjected to band pass processing in filters 109 to 112. The signals subjected to the band pass processing in filters 109 to 110 are subjected to the orthogonal modulation with carrier frequency f1 in orthogonal modulation circuit 701. Further, the signals subjected to the band pass processing in filters 111 to 112 are subjected to the orthogonal modulation with carrier frequency f2 in orthogonal modulation circuit 702. Further, adder 801 adds the orthogonal modulated signals. The representation on the frequency axis is as shown in FIG. 10.

Next, D/A converter 802 converts the added digital signal into an analog signal. BPF 710 eliminates unnecessary frequency components, mixer 711 upconverts the resultant signal to the carrier frequency, and BPF 712 eliminates unnecessary frequency components.

In the case of a radio communication apparatus, the resultant signal subjected to conversion into the multicarrier frequency is amplified in an amplifier and then transmitted from an antenna. Further, in the case of a cable communication apparatus, the resultant signal subjected to conversion into the multicarrier frequency is amplified in an amplifier and then transmitted through a cable.

In addition, the peak power detection method is the same as in the first and second embodiments. In the case where the peak power is detected with the method in the second embodiment, filters 124 to 127 are not needed. Further, the calculation method for correction coefficient a and the correction method are also the same as in the first and second embodiments.

According to the above-mentioned processing, the same power combining method with the orthogonal modulation is used for the transmission and the peak power detection. In other words, the processing is executed for the digital signals, and therefore it is possible to detect the peak power correctly, and based on the detected power, suppress the peak power. Further, since it is possible to employ an orthogonal modulator with a band for a single carrier frequency, it is possible to configure the orthogonal modulator in expensive.

In addition, the above-mentioned first to fourth embodiments explain the case where number of carrier frequencies is two to simplify the explanation, however it may be possible to use any number as the number of carrier frequencies in the present invention.

Further, in the above-mentioned first to fourth embodiments, the threshold level may be adjusted corresponding to a modulation method and band pass method. Furthermore, in the case where the communication system is the CDMA system, the threshold level may be adjusted corresponding to the number of multiplexed codes. Thus, even in the case where filters are not used in the peak power detection method, it is possible to correctly estimate the peak power level generated between symbol points.

The transmission apparatus of the present invention can be provided in a base station apparatus and a mobile station apparatus, and therefore can be used in radio communication systems in which radio communications are performed between the base station apparatus and the mobile station apparatus.

As explained above, the transmission apparatus employing the peak power reduction method in the communication system with a plurality of carrier frequencies according to the present invention, it is possible to attenuate the peak power prior to the signal output, thereby enabling no use of the amplifier configured in such a manner that distortions are not generated therein when a large peak power level is inputted thereto.

In addition, according to the peak power reduction method of the present invention, it is possible to reduce the peak power without generating unnecessary frequencies other than the frequency band. By reducing the peak power, it is possible to reduce the back-off in an amplifier. Accordingly, it is possible to make the size of the amplifier small.

This application is based on the Japanese Patent Application No.HEI10-119562 filed on Apr. 28, 1998, entire content of which is expressly incorporated by reference herein.

Industrial Applicability

The transmission apparatus of the present invention is applicable to the base station apparatus and the mobile station apparatus in digital radio communication systems.

What is claimed is:

1. A transmission apparatus having a transmitter and a peak power corrector in parallel, said transmitter comprising:
   a filter that executes filtering processing on each of a plurality of transmission signals with different carrier frequencies;
   a combining system that combines the plurality of transmission signals subjected to the filtering processing;
   a transmission system that transmits a signal combined in said combining system; and
   a suppression system that suppresses an amplitude of each of the plurality of transmission signals prior to the filtering processing, according to a correction value input from said peak power corrector; and
   said peak power corrector comprising:
   an adding system that adds the plurality of transmission signals prior to the filtering processing in said transmitter, the plurality of transmission signals being input from said transmitter;
   a detection system that detects a peak power of a signal added in said adding system; and
   a correction value calculation system that inputs the correction value calculated in association with the peak power to said suppression system in said transmitter when the detected peak power exceeds a threshold level.

2. The transmission apparatus according to claim 1, wherein said transmitter further comprises an orthogonal modulation system that executes orthogonal modulation on an analog transmission signal.

3. The transmission apparatus according to claim 1, wherein said transmitter further comprises an orthogonal modulation system that executes orthogonal modulation on a digital transmission signal.

4. The transmission apparatus according to claim 1, wherein said peak power corrector further comprises a filter with a tap length shorter than that of said filter in said transmitter.

5. The transmission apparatus according to claim 1, wherein said peak power corrector further comprises a modulation system that executes zero IF modulation with a frequency of 0 Hz as a center on the plurality of transmission signals input from said transmitter.

6. The transmission apparatus according to claim 1, wherein said correction value calculation system in said peak power corrector adjusts the threshold level corresponding to a modulation method.

7. The transmission apparatus according to claim 1, wherein said correction value calculation system in said peak power corrector adjusts the threshold level corresponding to a band pass limitation method.

8. The transmission apparatus according to claim 1, wherein said correction value calculation system in said peak power corrector adjusts the threshold level corresponding to a number of multiplexed codes in a CDMA communication.

9. The transmission apparatus according to claim 1, wherein said suppression system in said transmitter suppresses the amplitude of the transmission signal with a largest tap coefficient in said filter of said transmitter.

10. A base station apparatus including a transmission apparatus having a transmitter and a peak power corrector in parallel, said transmitter comprising:
    a filter that executes filtering processing on each of a plurality of transmission signals with different carrier frequencies;
    a combining system that combines the plurality of transmission signals subjected to the filtering processing;
    a transmission system that transmits a signal combined in said combining system; and
    a suppression system that suppresses an amplitude of each of the plurality of transmission signals prior to the filtering processing, according to a correction value input from said peak power corrector; and
said peak power corrector comprising:
    an adding system that adds the plurality of transmission signals prior to the filtering processing in said transmitter, the plurality of transmission signals being input from said transmitter;
    a detection system that detects a peak power of a signal added in said adding system; and
    a correction value calculation system that inputs the correction value calculated in association with the peak power to said suppression system in said transmitter when the detected peak power exceeds a threshold level.

11. A mobile station apparatus including a transmission apparatus having a transmitter and a peak power corrector in parallel, said transmitter comprising:
    a filter that executes filtering processing on each of a plurality of transmission signals with different carrier frequencies;
    a combining system that combines the plurality of transmission signals subjected to the filtering processing;
    a transmission system that transmits a signal combined in said combining system; and
    a suppression system that suppresses an amplitude of each of the plurality of transmission signals prior to the filtering processing, according to a correction value input from said peak power corrector; and
said peak power corrector comprising:
    an adding system that adds the plurality of transmission signals prior to the filtering processing in said transmitter, the plurality of transmission signals being input from said transmitter;
    a detection system that detects a peak power of a signal added in said adding system; and
    a correction value calculation system that inputs the correction value calculated in association with the peak power to said suppression system in said transmitter when the detected peak power exceeds a threshold level.

* * * * *

UNITED STATES PATENT AND TRADEMARK OFFICE
CERTIFICATE OF CORRECTION

PATENT NO. : 6,522,869 B1  Page 1 of 1
DATED : February 18, 2003
INVENTOR(S) : K. Hiramatsu et al.

It is certified that error appears in the above-identified patent and that said Letters Patent is hereby corrected as shown below:

<u>Title page,</u>
Item [56], References Cited, U.S. PATENT DOCUMENTS, the following references should be included:
-- 5,056,109   10/09/91   Wang et al.
   5,461,639   10/24/95   Wheatley, III et al. --

Signed and Sealed this

Twenty-second Day of July, 2003

JAMES E. ROGAN
*Director of the United States Patent and Trademark Office*